April 19, 1927.   1,625,109
F. P. VOGT ET AL
AUTOMOBILE LOCK
Filed Dec. 2, 1921
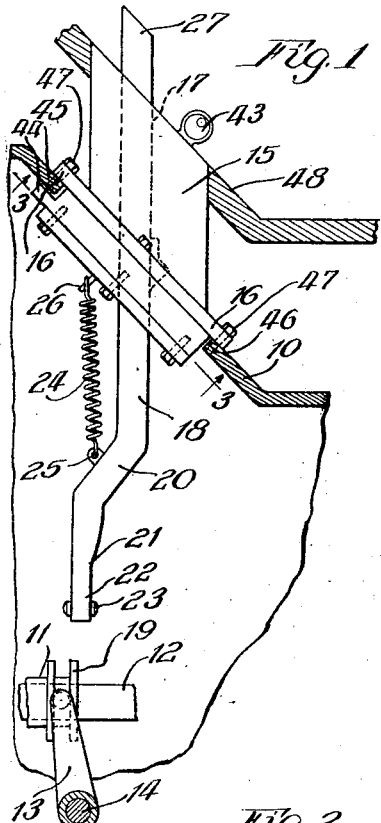
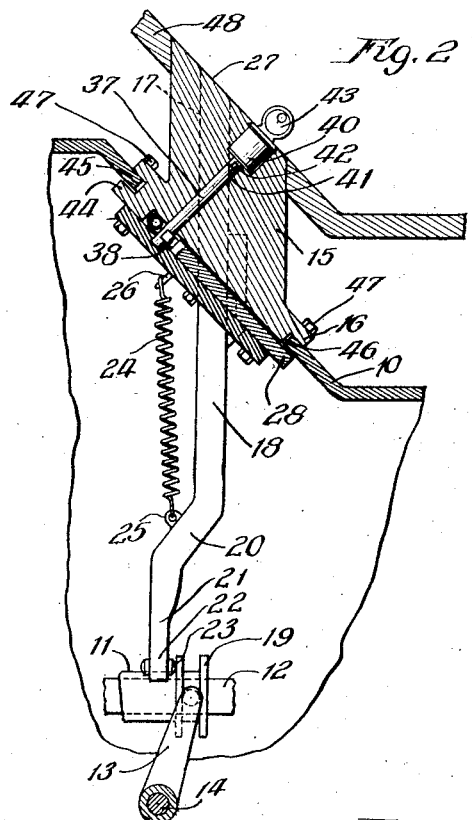
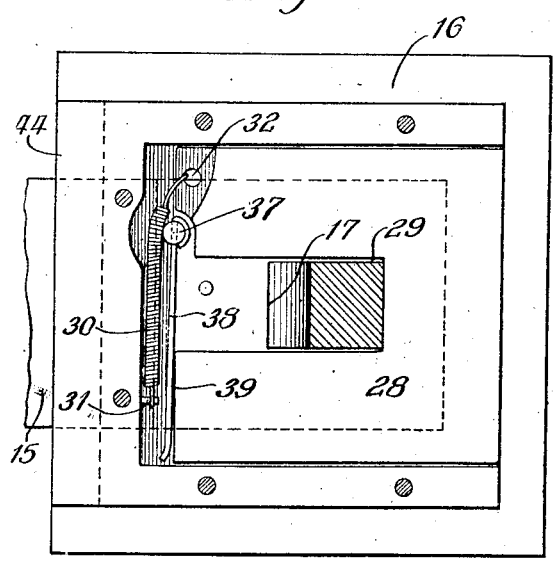
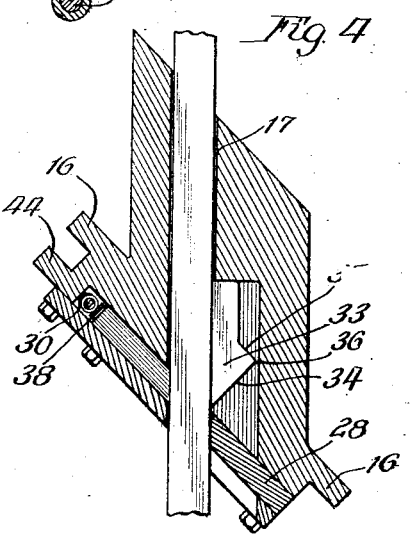
Inventor:
Frank P. Vogt
Edward C. Darn
By: Wm. O. Belt Atty.

Patented Apr. 19, 1927.

1,625,109

UNITED STATES PATENT OFFICE.

FRANK P. VOGT AND EDWARD C. DORN, OF CHICAGO, ILLINOIS.

AUTOMOBILE LOCK.

Application filed December 2, 1921. Serial No. 519,316.

This invention relates to automobiles and has for its object to prevent unauthorized operation of such machines.

More specifically, the object of the invention is to make it possible for the operator to lock the clutch in inoperative position when it is desired to put the vehicle temporarily out of commission.

Another object of the invention is to provide means operated by the devices for locking the clutch for securely fastening the locking devices to the clutch casing. Further objects of the invention will become apparent as the description is read in connection with the accompanying drawing showing a selected embodiment of the invention, and in which—

Fig. 1 is a side elevation of an embodiment of the invention showing parts of the automobile in section;

Fig. 2 is a vertical section through the embodiment of the invention;

Fig. 3 is a transverse section; and

Fig. 4 is an enlarged detail.

Referring to the drawing, 10 indicates a portion of the casing surrounding the clutch and associated parts, 11 is a clutch release sleeve slidably mounted on the power shaft 12 and operated by the clutch release fork 13. We have considered it unnecessary to illustrate the clutch in detail, or even show the spring which normally holds it engaged, as these parts are conventional in machines of the present day. The release fork 13 is usually carried by a transverse shaft 14, which is equipped with the customary clutch pedal that is usually pressed forward to release the clutch in a well understood manner.

In the present embodiment of the invention we mount a locking device on the casing 10 which can be readily operated to securely fasten the clutch in released position. This device includes a body portion 15 which is normally supported in upright position by the flanges 16 resting on and secured to the casing 10. This body portion is provided with a locking bar having a substantially vertical passage-way 17 for a forked arm 18 adapted to be forced downwardly into locking engagement with a flanged collar 19 carried by the clutch release sleeve 11. For convenience in location, this arm is offset at 20 to place the forked end 21 in proper position to engage the collar 19 by a downward movement, and the upper end 27 in convenient reach of the operator.

The arms 22 of the fork are preferably equipped with bearing pins 23 for engagement with the flanges of the collar 19. A spring 24 secured at one end to the lug 25 on the arm at the off-set portion 20, and at the other end to the lug 26 carried by some fixed part, tends to hold the arm 18 in inoperative position so that there is no interference with the normal operation of the clutch until it is desired to lock the clutch in inoperative position, when it is only necessary to press the clutch pedal forward and press downwardly on the upper end 27 of the arm 18 until the forked arms 22 are seated between the flanges of the collar 19.

The arm 18 is locked in its lowermost position by a plate 28 mounted to slide in the lower portion of the body 15 in a direction parallel to the flanges 16. This plate is notched as shown in Fig. 3 to provide a space 29 for the arm 18, and is normally held in locking position by a spring 30 here shown as connected at one end to an eye 31 on the body 15 and at the other end to an eye 32 on the plate 28. It will be obvious, however, that any suitable arrangement of springs may be used for normally holding this plate in locked position. The rear face of the arm 18 is equipped with a lug 33 having an inclined face 34 and a locking seat 35. When the clutch is released and pressure is applied to the upper end 27 of the arm to move the fork into engagement with the collar 19, the inclined face 34 of the lug 33 moves the plate 28 downwardly in Fig. 4 against the resistance of the spring 30 and as soon as the corner 36 of the lug 33 passes the plate 28, the spring automatically moves the plate upwardly onto the locking seat 35 to secure the arm in locked position.

It will be obvious from the mechanism just described that some means must be provided to move the plate 28 downwardly away from the seat 35 before the arm 18 can be raised to unlock the clutch. To perform this function we have illustrated a shaft 37 journaled in the body portion 15 at right angles to the movement of the plate 28. This shaft is provided with an arm 38 adapted to co-act with the plate 28 along the end 39 as will be clear from Figs. 2 and 3. A cylinder lock 40 mounted in the upper face of the body portion 15 is connected with the shaft 37 and controls the operation of the shaft. As illustrated, the upper end of the shaft is equipped with a rib 41 seated in a complementary socket 42 in the lock plug which is rotated by means of a key 43.

From the foregoing it will be clear that we have provided simple means for locking the clutch in released position and have located the means so that it can be conveniently operated from the driver's seat. In order to make it impossible to release the fork 22 from the collar 19 by any means other than the lock 40, we have provided means for locking the body 15 to the casing 10 concurrently with the locking of the fork in the release collar. In addition to the flanges 16 which rest on the outer surface of the casing 10 the body 15 has across its forward side, a flange 44 parallel to the flanges 16 and spaced therefrom a sufficient distance to permit the body to be assembled to the casing 10 by inserting the upper portion 45 thereof between the flanges 44 and 16 as the body is moved onto its seat from the casing 10. The plate 28 is made of sufficient length to extend beyond the edge 46 of the opening in the casing 10 so as to lie on the inside of the casing opposite the lower flange 16 of the body 15 when it is in locked position against the seat 35. As a result, when the arm 18 is forced downwardly to lock the clutch in released position, the incline 34 moves the plate 28 well down along the inside of the casing 10 and when the plate moves upwardly onto the seat 35 it still extends below the upper portion of the casing 10, as indicated in Fig. 2. It will therefore be seen that in order to remove the fork 22 from the collar 19 by any means other than the operation of the lock 40, it will become necessary to break or cut away the casing 10. The body portion 15 is secured to the casing by bolts 47 and when the plate 28 is in proper position as illustrated in Figs. 1, 3 and 4, the entire device can be removed from the casing by first taking out the bolts 47. But when the arm 18 has been forced down and the plate 28 is on the seat 35, removing the bolts 47 and prying against the body 15 or the flanges 16 will be futile unless sufficient force is used to break the casing 10, which would put the car out of service.

We have illustrated the upper face of the body 10 as inclined to correspond with the upper face of the foot board 48, but it will be obvious that this feature can be modified to suit the individual taste or the requirements of a particular automobile.

Various changes may be made in the form, construction and arrangement of the parts without departing from the spirit and scope of the invention or sacrificing any of its material advantages, the form hereinbefore described being merely a preferred embodiment thereof.

We claim:

1. In an automobile, a clutch for transmitting driving power, a casing for said clutch, means for releasing said clutch, locking means mounted on said casing and adapted to lock said clutch releasing means with said clutch in released position, and means normally out of engagement with the casing and adapted to be operated by said locking means to lock said locking means to said casing when said clutch releasing means is locked.

2. In an automobile, a clutch for transmitting the driving power, means for releasing said clutch, a casing for said clutch having an opening therein, a locking device including a body secured in said opening, said locking device being adapted to lock said clutch releasing means with said clutch in released position, and a plate slidable in the body for locking said locking means to said casing with said clutch in said released position and for locking said body to said casing.

3. In an automobile, a casing having an opening therein, a body removably secured in said opening and having a flange engaging the casing at one side of said opening, a locking bar mounted in said body, and a slide movable in said body within the casing to engage the casing at the opposite side of said opening and cooperating with said flange to hold said body in the opening in the casing.

4. In an automobile, a casing having an opening therein, a clutch within the casing adapted to transmit the driving power, means for locking said clutch including a body portion having a recess to receive the edge of the casing at one side of said opening and a flange for contact with the casing at another side of the opening, a movable plate carried by said body portion and adapted to engage the casing opposite to said flange, and a bar carried by said body portion adapted to effect a locking engagement with said clutch and to move said plate into engagement with said casing.

5. In an automobile, a casing having an opening therein, a clutch within the casing adapted to transmit the driving power, means for locking said clutch including a body portion having a groove to receive the casing at one side of the opening and a flange to rest on the casing at the other side of the opening, whereby said body portion may be inserted in said opening and engaged with the casing, a locking bar carried by said body portion, a movable plate slidable in that part of said body portion within the casing, and means on the bar for moving said plate to engage the wall of the casing immediately under said flange to lock said body portion to the casing.

6. In an automobile, a casing having an opening therein, a clutch within the casing adapted to transmit the driving power, means for locking said clutch including a body portion having a groove to receive the casing at one side of the opening and a flange resting on the casing at the other side of the opening whereby said body portion may be inserted in said opening and engaged with the casing, a movable locking bar carried by said body portion, a plate movable in that part of said body portion within the casing, and means on the bar to move said plate to engage that part of the casing immediately under said flange to lock said body portion to the casing and also to lock the bar to the body portion.

7. In an automobile, a casing having an opening therein, a clutch within the casing adapted to transmit the driving power, means for locking said clutch including a body portion removably engaged in said opening with said casing, a locking bar movable in said body portion, a locking plate slidable in that part of said body portion within the casing, and cam means on the locking bar for moving said plate to lock said plate to the casing and to lock the locking bar to the plate.

8. In an automobile, a casing having an opening therein, a clutch within the casing adapted to transmit the driving power, means for locking said clutch including a body portion removably engaged in said opening with said casing, a locking bar movable in said body portion, a locking plate slidable in that part of said body portion within the casing, cam means on the locking bar for moving said plate to lock said plate to the casing and to lock the locking bar to the plate, and means for moving said plate to release said locking bar and permit said plate to be released from locking engagement with said casing.

FRANK P. VOGT.
EDWARD C. DORN.